United States Patent
Reinprecht et al.

(10) Patent No.: US 9,563,010 B2
(45) Date of Patent: Feb. 7, 2017

(54) METHOD FOR GENERATING A RUNNING LIGHT EFFECT ON AN OPTICAL WAVE GUIDE STRUCTURE AND OPTICAL WAVE GUIDE STRUCTURE

(71) Applicant: ZIZALA LICHTSYSTEME GMBH, Wieselburg (AT)

(72) Inventors: Markus Reinprecht, Wieselburg (AT); Thomas Graf, Pottenbrunn (AT); Anton Faffelberger, Krummnußbauem (AT)

(73) Assignee: ZKW GROUP GMBH, Wieselburg an der Erlauf (AT)

( * ) Notice: Subject to any disclaimer, the term of this patent is extended or adjusted under 35 U.S.C. 154(b) by 224 days.

(21) Appl. No.: 14/379,256

(22) PCT Filed: Feb. 14, 2013

(86) PCT No.: PCT/AT2013/050039
§ 371 (c)(1),
(2) Date: Aug. 15, 2014

(87) PCT Pub. No.: WO2013/120124
PCT Pub. Date: Aug. 22, 2013

(65) Prior Publication Data
US 2015/0008840 A1   Jan. 8, 2015

(30) Foreign Application Priority Data
Feb. 16, 2012 (AT) .................. A 197/2012

(51) Int. Cl.
*F21V 8/00*  (2006.01)
*H05B 37/02*  (2006.01)
(Continued)

(52) U.S. Cl.
CPC .......... *G02B 6/0096* (2013.01); *F21S 48/225* (2013.01); *F21S 48/2237* (2013.01);
(Continued)

(58) Field of Classification Search
CPC ... G02B 6/0075; G02B 6/0076; G02B 6/0078; G02B 6/0083; G02B 6/4274; F21S 48/225; F21S 48/2237; F21S 48/2268
See application file for complete search history.

(56) References Cited

U.S. PATENT DOCUMENTS

| 3,796,951 A | 3/1974 | Joseph | |
| 2007/0290829 A1* | 12/2007 | Geiger | B60Q 1/2665 340/475 |

(Continued)

FOREIGN PATENT DOCUMENTS

| EP | 0935091 A1 | 8/1999 |
| EP | 1903358 A1 | 3/2008 |

(Continued)

OTHER PUBLICATIONS

1st Office Action dated Feb. 11, 2013 of patent application No. 197/2012.

(Continued)

*Primary Examiner* — Douglas W Owens
*Assistant Examiner* — Pedro C Fernandez
(74) *Attorney, Agent, or Firm* — Sutherland Asbill & Brennan LLP (57) ABSTRACT

The invention relates to an optical wave guide structure (1) comprising at least one optical wave guide (2, 2'; 11, 12) and at least two light input positions (A . . . E), each of which is associated with a light source (3, 3'; 4, 4', 4"; 22a . . . e), the optical wave guide being designed to guide the input light and to emit light based on irregularities (6) embodied on the optical wave guide, and the light sources (3, 3'; 4, 4', 4"; 22a . . . e) being associated with an actuating circuit (9), which is designed to control the brightness levels of the light sources according to predefinable dimming curves as a function of time.

11 Claims, 5 Drawing Sheets

(51) Int. Cl.
 H05B 33/08 (2006.01)
 F21S 8/10 (2006.01)
(52) U.S. Cl.
 CPC ......... *F21S 48/2268* (2013.01); *G02B 6/001* (2013.01); *H05B 33/0842* (2013.01); *H05B 37/0209* (2013.01); *G02B 6/0006* (2013.01)

(56) References Cited

U.S. PATENT DOCUMENTS

| | | | | |
|---|---|---|---|---|
| 2008/0030981 | A1* | 2/2008 | Mrakovich | G02B 6/001 362/219 |
| 2010/0220492 | A1* | 9/2010 | Richardson | G02B 6/0028 362/551 |
| 2011/0110111 | A1* | 5/2011 | Rho | F21S 48/1154 362/509 |
| 2012/0020103 | A1* | 1/2012 | Okada | B60Q 1/2607 362/510 |

FOREIGN PATENT DOCUMENTS

| | | |
|---|---|---|
| EP | 2317212 A1 | 5/2011 |
| EP | 2337428 A2 | 6/2011 |
| WO | 2007/069124 A1 | 6/2007 |
| WO | 2010/046806 A1 | 4/2010 |
| WO | 2011/096680 A2 | 8/2011 |

OTHER PUBLICATIONS

Search Report of corresponding International Patent Application No. PCT/AT2013/050039, dated Aug. 21, 2013.
1st Office Action dated Jan. 18, 2013 of patent application No. A 50041/2012.
Search Report of corresponding International Patent Application No. PCT/AT2013/050041, dated Aug. 26, 2013.
Search Report of International Patent Application No. PCT/AT2013/050018, dated Aug. 19, 2013.

* cited by examiner

METHOD FOR GENERATING A RUNNING LIGHT EFFECT ON AN OPTICAL WAVE GUIDE STRUCTURE AND OPTICAL WAVE GUIDE STRUCTURE

The invention relates to a method for generating a chasing effect on an optical wave guide structure comprising at least one optical wave guide and at least two light input positions, each of which is associated with a light source, wherein the optical wave guide is designed to guide the input light and to emit light based on irregularities embodied on the optical wave guide.

The invention further relates to an optical wave guide structure comprising at least one optical wave guide and at least two light input positions, each of which is associated with a light source, wherein the optical wave guide is designed to guide the input light and to emit light based on irregularities embodied on the optical wave guide.

Light bars are used increasingly in vehicle construction, wherein light, such as from light-emitting diodes, is input into a light bar on an end face. The light is fully reflected in the interior on the delimiting walls of the optical wave guide, which typically has a circular cross-section, but optionally may also have a different, such as elliptic or rectangular cross-section, however the light is deflected at the irregularities, which have a prism shape, for example, and is essentially emitted on the side located opposite the irregularities. The geometry of light bars used in motor vehicle construction is determined to a very large degree by design specifications, wherein the desired contours often can no longer be implemented by a single light bar and it is necessary in many cases to bifurcate one light bar into two branches. DE 103 56 483 A1 and DE 101 53 543 A1 shall be mentioned among many documents showing light bars.

An optical wave guide structure of the type mentioned above is known from EP 0 935 091 A1. This document relates to a bar-shaped optical wave guide, in which light-deflecting prisms provided as irregularities have a width transversely to the bar axis that increases starting from the light injection surface so as to achieve even luminance across the entire length, wherein one embodiment is also described in which a light injection surface, and accordingly two light sources, are provided at the two ends of the optical wave guide.

It is the object of the invention to create a method for generating a chasing effect and an optical wave guide structure that is suitable for carrying out the method and that yields a chasing effect without using a large number of actuated light sources. Chasing effects are presently implemented by a plurality of consecutive and sequentially actuated light sources, such as filament lamps or LEDs, which makes such structures expensive to produce and maintain.

The object is achieved by a method of the type mentioned above, in which according to the invention the brightness levels of the light sources are changed independently from each other according to a predefined rule as a function of time.

In one advantageous embodiment it is provided that the brightness of a first light source is reduced starting from a maximum value according to a first falling dimming ramp, and the brightness of a second light source is reduced starting from a maximum value according to a second falling dimming ramp, wherein the reduction in the brightness of the second light source begins with time delay in relation to the starting time of the reduction of the first light source. This creates the impression that light flows from one end of a light bar to the other end.

In another advantageous embodiment, which enables a wipe effect, it may be provided that the brightness of a first light source is increased up to a maximum value according to a first rising dimming ramp, is maintained at this value for a first fixed time duration, and is then reduced to a minimum value according to a first falling dimming ramp, and that the brightness of a second light source is increased up to a maximum value according to a second rising dimming ramp, is maintained at this value for a second fixed time duration, and is then reduced to a minimum value according to a second falling dimming ramp, wherein the activation point of the second rising dimming ramp is time-delayed by a start delay time in relation to the activation point of the first rising dimming ramp, and the activation point of the second falling dimming ramp is time-delayed by a stop delay time in relation to the activation point of the first falling dimming ramp.

It may furthermore be advisable for the activation point of the second rising dimming ramp to take place during the first rising dimming ramp.

In addition, the maximum value of the second light source can persist until the end of the first falling dimming ramp of the first light source.

If the light sources emit light having differing colors, color transition effects can additionally be achieved.

The object at hand is further achieved by an optical wave guide structure of the type mentioned above, in which according to the invention an actuating circuit is associated with the light sources, the actuating circuit being designed to control the brightness levels of the light sources according to predefinable dimming curves as a function of time.

An embodiment in which the actuating circuit comprises a pulse generator for generating a basic pulse having a predetermined duration is expedient.

It is advantageous if the output of the pulse generator is supplied to a first pulse shaper for generating a first actuating pulse having a rising and falling dimming ramp, the output of the pulse generator moreover is supplied to a time-delay module for forming a delay in the rise and/or fall of the basic pulse, the pulse formed in the time-delay module is supplied with a delayed rising or falling edge to a second pulse shaper for generating a second actuating pulse having an accordingly delayed rising and falling dimming ramp, and the outputs of the first and second pulse generators are each supplied to at least one actuating and driver stage for the first and second light sources.

The optical wave guides are bent in variants that often prove to be expedient.

It may also be useful for the optical wave guide structure to comprise two optical wave guides, which extend in parallel and are designed as one piece.

It may be provided in a further advisable variant that the optical wave guide structure comprises two optical wave guides, which are brought together at one end and which have a light input position for a first shared light source at this end, and a second and a third light source on a second and a third light input position at the other end.

Yet another practical variant provides for it to comprise at least two optical wave guides, a light source being associated with each optical wave guide at one end on a light input position, each optical wave guide comprising a luminous section, and the luminous sections connecting to each other, forming an essentially continuous luminous structure. It is advantageous for this purpose if light guide sections originating from the light input positions lead to the luminous sections via an angled region, since the input points can thus be disposed at a distance from the light exit point.

The invention will be described in greater detail hereafter based on exemplary embodiments, which are illustrated in the drawings. In the drawings.

With reference to FIGS. 1 to 5, a number of exemplary optical wave guide structures and the optical wave guides used in these will initially be described.

Figures 1, 2:
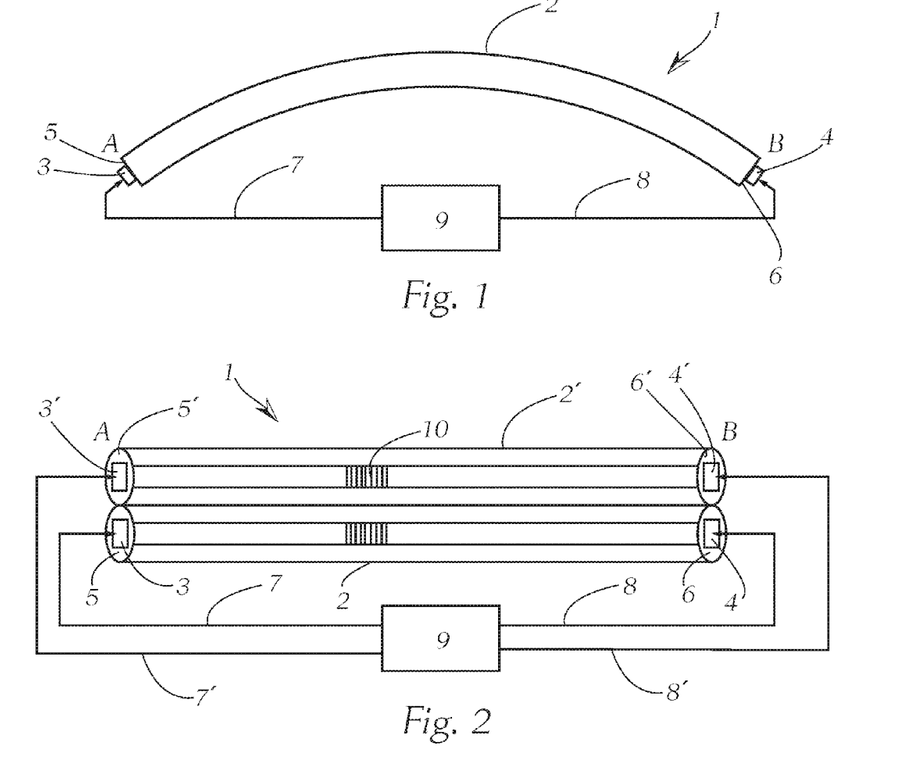
FIG. 1 shows a view of a first embodiment of an optical wave guide structure according to the invention.
FIG. 2 shows a view of a second embodiment of an optical wave guide structure according to the invention.

The structure 1 according to FIG. 1 shows a slightly curved optical wave guide 2, which at each of the two ends thereof comprises light sources 3 and 4 on light input positions A and B, respectively, the light sources being able to irradiate light into a light entry surface 5, 6. Each of the two light sources 3, 4 is supplied via feed lines 7, 8 from an actuating circuit 9. Possible light sources are preferably LEDs; however, other light sources such as filament lamps, xenon lamps and the like may also be used.

FIG. 2 shows an optical wave guide structure 1 which is designed as a double bar and comprises two optical wave guides 2, 2', which are designed as one piece. Each optical wave guide 2, 2', in turn, comprises light entry surfaces 5, 5; 6, 6', into which light sources 3, 3; 4, 4' can irradiate light. An actuating circuit supplies these light sources 3, 3; 4, 4' via feed lines 7, 7; 8, 8'. It is also apparent from FIG. 2 that each optical wave guide comprises a structure made of irregularities 10, wherein these irregularities are generally designed as prisms or in a prism-like manner.

Figure 3:
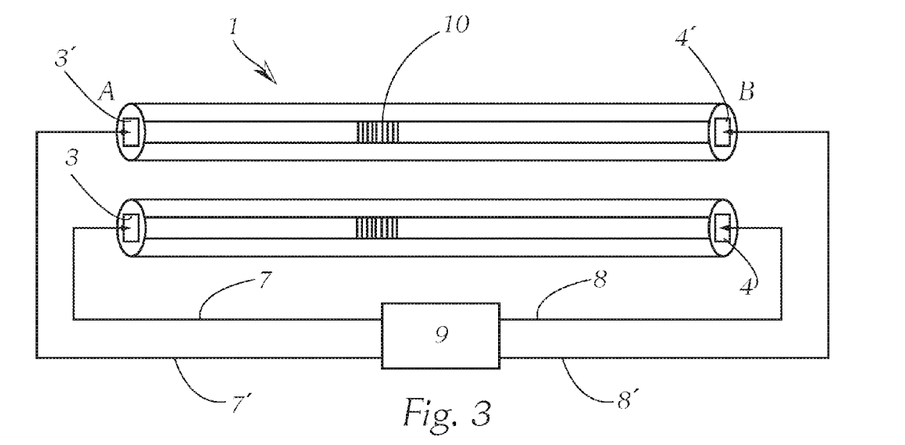
FIG. 3 shows a view of a third embodiment of an optical wave guide structure according to the invention.

The optical wave guide structure 1 according to FIG. 3 differs from that according to FIG. 2 only in that the two optical wave guides 2, 2' are not designed as one piece, but separately from each other.

Figure 4:
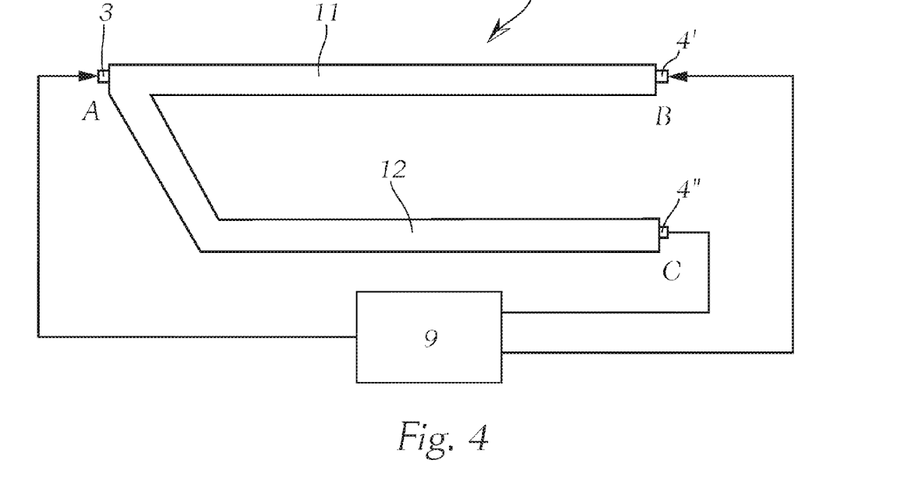
FIG. 4 shows a view of a fourth embodiment of an optical wave guide structure according to the invention.

FIG. 4 shows a further optical wave guide structure 1, which—from a lighting perspective—is composed of two separate optical wave guides 11, 12, wherein one optical wave guide 11 is straight and the second optical wave guide 12 is curved. From a mechanical perspective, the optical wave guide structure 1 has an integral design and has a first light input position A at the site where the two optical wave guides 11, 12 come together, and further light input positions B and C at the ends of the two optical wave guides 11, 12, respectively. The light sources, which are not described in more detail here, are again actuated by way of an actuating circuit 9.

Figure 5:
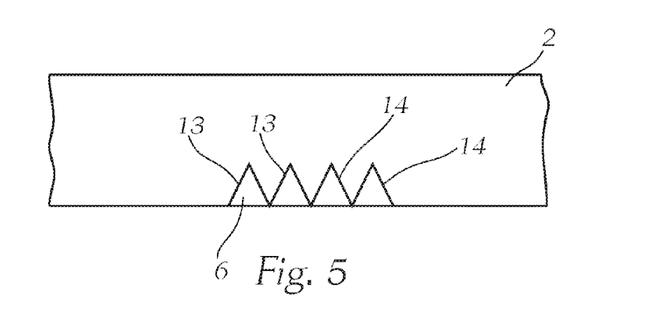
FIG. 5 shows the view of a section of an optical wave guide that is used in the invention.

FIG. 5 shows an enlarged section of an optical wave guide 2, on which the structure made of irregularities 10 is apparent. The prisms of the structure 6 here each have two light surface sides, which is to say light surface sides 13 and light surface sides 14 in each case. This allows light that is input from both sides of the optical wave guide 2 to be emitted, essentially on the side of the optical wave guide 2 located opposite the structure 10.

Referencing FIG. 6, a first example of the method according to the invention for generating a chasing effect shall now be described in connection with the shown optical wave guide structures. The upper diagram of FIG. 6 relates to the intensity progression of a first light source on position A, and the diagram beneath relates to the intensity progression of a second light source on position B, wherein these positions A and B correspond to those shown in FIG. 1, for example. At a time $t_1$, the actuating circuit 9 begins to supply the first light source in accordance with a dimming ramp, which here is linear, which is to say the intensity I increases up until a point in time $t_2$. At this point in time $t_2$, the second light source on position B also starts to be supplied, here again with a linear dimming ramp. Up until a time $t_3$, the first light source on position A continues to be supplied according to a dimming ramp, however the slope of the same is less than during the time $t_1$ to $t_2$. Starting with a point in time $t_3$ until a point in time $t_4$, the first light source on position A is reduced slightly, as is apparent from the falling, short ramp in the time between $t_3$ and $t_4$. The second light source on position B continues to be dimmed up during the entire time period from $t_2$ until $t_4$ according to a dimming ramp, which here is linear, until finally at the point in time $t_4$ both light sources on positions A and B are illuminated with maximum intensity, which here is until a deactivation time $t_5$. $t_{\ddot{u}}$ denotes the overlap period, which is to say the time during which both light sources emit light in accordance with the predefined dimming curves. The two light sources, of course, do not necessarily have to be illuminated with maximum intensity; rather, it is possible to dim one or both light sources down to as low as 0% so as to increase the wipe effect.

The time at which the light source on position A is dimmed up is dependent on the application and may range between a few milliseconds and several seconds. With time lag by $t_2-t_1$, the second light source on position B, which here is on the other side of the optical wave guide 2, is dimmed up.

The optical wave guide is designed so that the entire optical wave guide has even luminance to as great an extent as possible with full illumination. During the dimming phases of the two light sources, however, the light bar or optical wave guide is not homogenous, and the changing luminance profile is designed during the dimming phases so that a wipe effect—in the structure 1 according to FIG. 1 from left to right—is perceived, wherein the correct selection of the overlap period and of the dimming ramps is important for this wipe effect.

Experience has shown that the wipe effect can be intensified by slightly reducing the intensity $I_4$ of the first light source in the above-described reduction range, which is to say during the time from $t_3$ until $t_4$, for example to approximately 80% of the maximal intensity. Such down dimming by a certain amount can take place not only during the dimming ramp of the second light source on position B, but also thereafter.

In one possible application as a "wipe-flash" in motor vehicles, for example, feeding takes place from both sides of a light bar from orange-colored light sources. A first light source is then dimmed up within approximately 100 ms, and the dimming process for the second light source is initiated approximately 10 to 20% before full brightness is reached, so that full brightness is reached after maximally 200 ms.

The light sources used within the scope of the invention by no means have to emit white light or be monochromatic; rather, it is also possible to use light sources having changing colors (RGB light sources). It is possible to generate a color transition from red to green lasting several seconds, for example on a first position A. Due to a time-delayed color transition on the second position, an observer gains the impression that the color in the optical wave guide flows from one side to the other.

Figure 6:
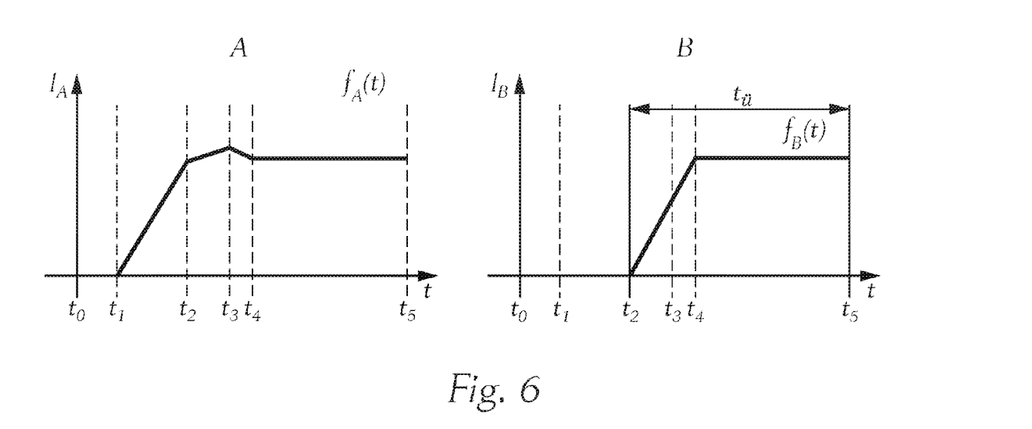
FIG. 6 shows a first exemplary time curve of the brightness control of two light sources that are used in the invention.
Figure 7:
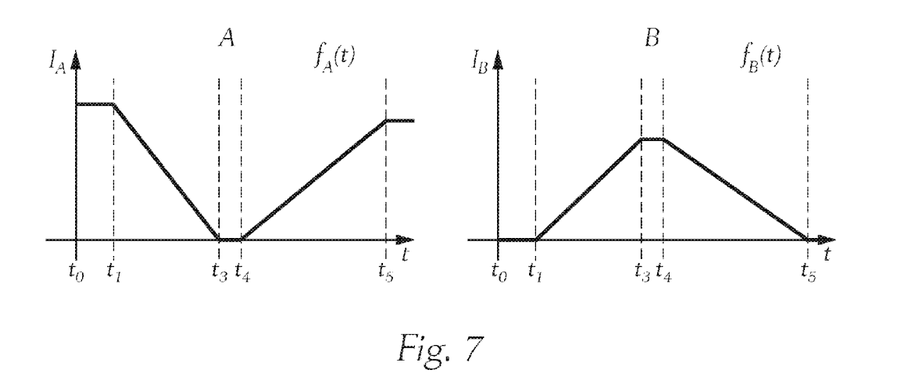
FIG. 7 shows a second exemplary time curve of the brightness control of two light sources that are used in the invention.

Another example of possible dimming curves is shown in the two illustrations of FIG. 7, which shall be understood analogously to those according to FIG. 6. The intensity $I_A$ of a first light source on position A starts with a particular maximum value, which can be arbitrarily defined, at the point in time $t_0$. At a point in time $t_1$, down dimming begins using a falling dimming ramp, wherein this is shown here in linear fashion by way of example, however logarithmic, exponential, quadratic or other courses of the curve are also possible for all dimming ramps described here, wherein the intensity decreases to a minimum value until a point in time $t_2$ and remains at this minimum value, which likewise can be freely selected, such as 0% or 10% of the maximum intensity. It shall be noted here that the falling ramp can already being at the point in time $t_0$, which is to say the even intensity value from $t_0$ until $t_1$ can be skipped. At the point in time $t_3$, the light source on position A is actuated according to a rising dimming ramp, which is also shown in linear fashion here, but can also have a different course of the curve. The dimming ramp of the up dimming process can also begin immediately after the minimum value has been reached at the base point of the falling dimming ramp, which is to say the duration from $t_2$ to $t_3$ can be skipped. At the end of the rising dimming ramp, at a point in time $t_4$, the light source on position A has then again reached maximal brightness again.

A look at the intensity progression of the second light source on position B shows that the second light source is actuated so that the brightness progression over time is exactly opposite to that of the first light source on position A. It is also possible here, in accordance with the variant described above in FIG. 6, to provide time delays in the activation of the dimming ramps, and it is also possible to predefine different minimum and maximum values of the two light sources. This type of actuation is useful when using differently colored light sources, since this creates the effect that the light from position A (blue, for example) is slowly displaced by the light from position B (white, for example), until at the point in time t2 the light rod appears only in white.

Figure 8:
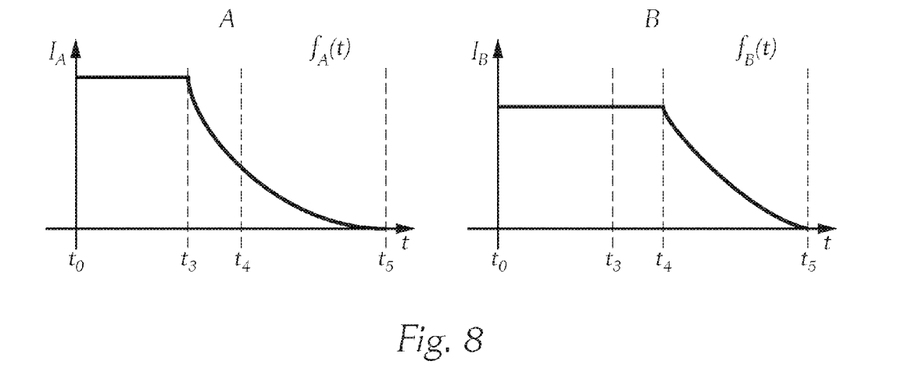
FIG. 8 shows a third exemplary time curve of the brightness control of two light sources that are used in the invention.

Time-delayed down dimming of both light sources is described based on the dimming curves of two light sources on positions A and B shown in FIG. 8, which creates the impression of light flowing out of the optical wave guide for the observer. A first light source on position A is actuated so that the same is illuminated at a constant intensity from a point in time $t_0$ until a point in time $t_1$ and, starting at a time $t_1$ until a point in time $t_3$, the same is dimmed down according to a falling dimming curve.

A second light source on position B is likewise illuminated initially, which is to say at the time $t_0$, with a certain intensity level, which remains constant beyond the time $t_1$ until a time $t_2$. It is not until the point in time $t_2$ that the second light source on position B is also dimmed down to a minimum value or to 0 according to a falling dimming curve, which is steeper than the falling dimming curve of the first light source, since the time available for dimming down is shorter.

Figure 9:
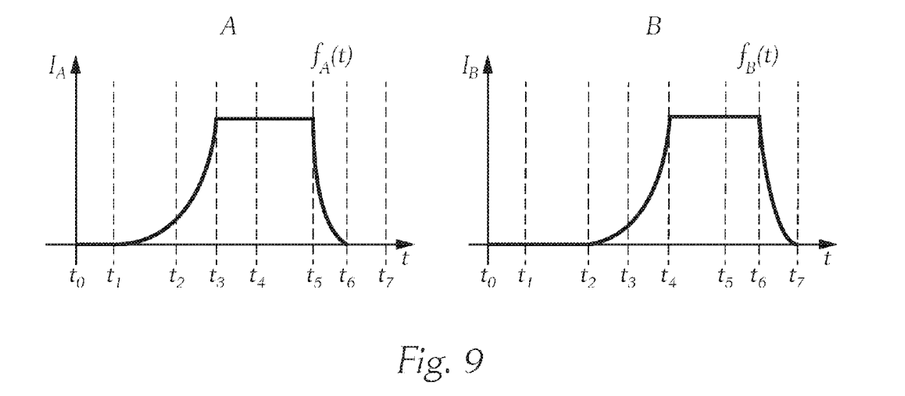
FIG. 9 shows a fourth exemplary time curve of the brightness control of two light sources that are used in the invention.

A further variant of the method according to the invention, which yields a different effect of a running light, shall now be described with reference to FIG. 9. The two light sources on positions A and B are deactivated between a point in time $t_0$ and a point in time $t_1$. At the point in time $t_1$, up dimming of the light source on position A begins along a first rising dimming ramp, until a maximum intensity value has been reached at a point in time $t_3$. The intensity of the light source on position A then remains constant until a point in time $t_4$, from where it then transitions toward 0 or a minimum value at a point in time $t_5$ with a falling dimming ramp.

In contrast, up dimming of the light source on position B does not start until a point in time $t_2$, which is located in the rising dimming ramp of the first light source. The rising dimming ramp of the second light source on position B extends up to a maximum value, which is reached at a point in time $t_4$, and remains at this maximum value until a point in time $t_6$. Here, the intensity then decreases according to a falling dimming ramp to a minimum value, or the value 0, at a point in time $t_7$ as a result of appropriate actuation by the actuating circuit 9. The slow up dimming of the first light source on position A creates the impression of a light bar or optical wave guide that becomes dark toward the end. The delayed up dimming of the second light source on position B brightens the region that is still dark, and both light sources are up-dimmed to a maximum. So as to generate a running effect, the light source 1 must first be dimmed down during the deactivation process.

Figure 10:
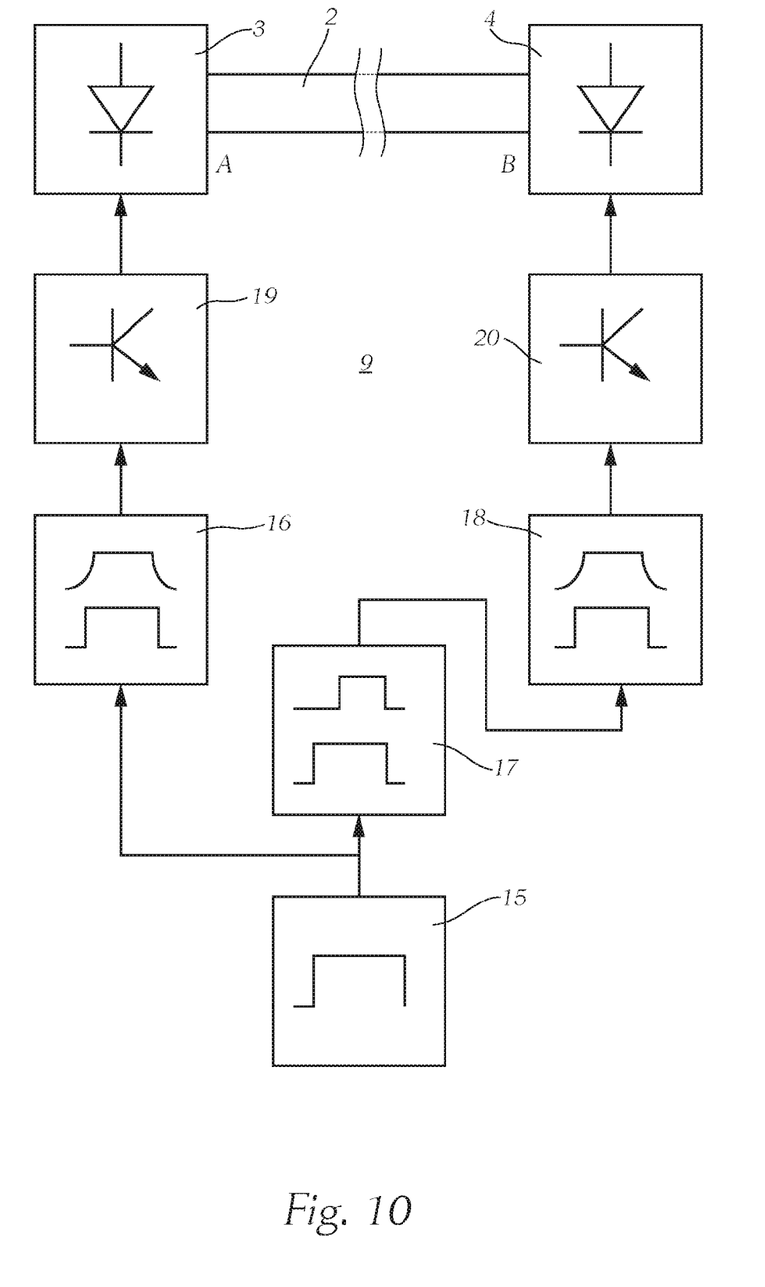
FIG. 10 shows a block diagram of an exemplary actuating circuit of an optical wave guide structure according to the invention.

The principle of an actuating circuit that is suitable for carrying out the method according to the invention will now be described with reference to FIG. 10, wherein this actuating circuit 9 is designed to control the brightness levels of the light sources according to predefinable dimming curves as a function of time. In FIG. 10, the functions that are essential for the actuating circuit 9 are divided into blocks. A pulse generator 15 is used to generate a basic pulse having a predetermined duration, wherein this basic pulse, which serves as the actuating or triggering pulse, can be generated periodically in a fixed progression or spontaneously with longer pauses.

The output of the pulse generator 15 is supplied to a first pulse shaper 16 for generating a first actuating pulse having a rising and falling dimming ramp, and to a time-delay module 17 for forming a delay in the rise and/or fall of the basic pulse. The pulse having a delayed rising or falling edge formed in the time-delay module 17 is supplied to a second pulse shaper 18 for generating a second actuating pulse having an accordingly delayed rising and falling dimming ramp. The time-delay module actuates the second pulse shaper 18 with a time that is adapted to the length of the light rod or to the desired effect. At the moment of deactivation, the time-delay module 17 also performs the time lag so as to bring about a wipe effect in the desired direction. The outputs of the first and second pulse shapers 16, 18 are each connected to at least one actuating and driver stage 19 and 20 for the first and second light sources 3, 4. The dimming ramps generated in the pulse shapers 16 and 18 are adapted to the human eye and to the freely selectable shape of the light bar. The dimming ramps are parameterized in each case to the geometry, to the sensitivity of the human eye, and to the desired effect (wipe or color shift), and in general they do not follow a mathematical function, but as was already indicated above, they can follow arbitrary functions, such as multiple continuous and/or composite mathematical functions, which can also include one or more jump discontinuities.

The rise and fall algorithms are designed differently so as to optimize the wipe effect. Each pulse shaper can actuate one or more actuating and driver stages 19, 20. Multiple pulse shapers and actuating and driver stages are also required in particular for color mixing applications. In the drawing, the option of using multiple pulse shapers 16 and 18, multiple actuating and driver stages 19, 20, as well as multiple first and second light sources 3, 4 is indicated with dashed lines. An optical wave guide 2 having two light input positions A and B is also shown to illustrate the overall structure.

Figure 11:
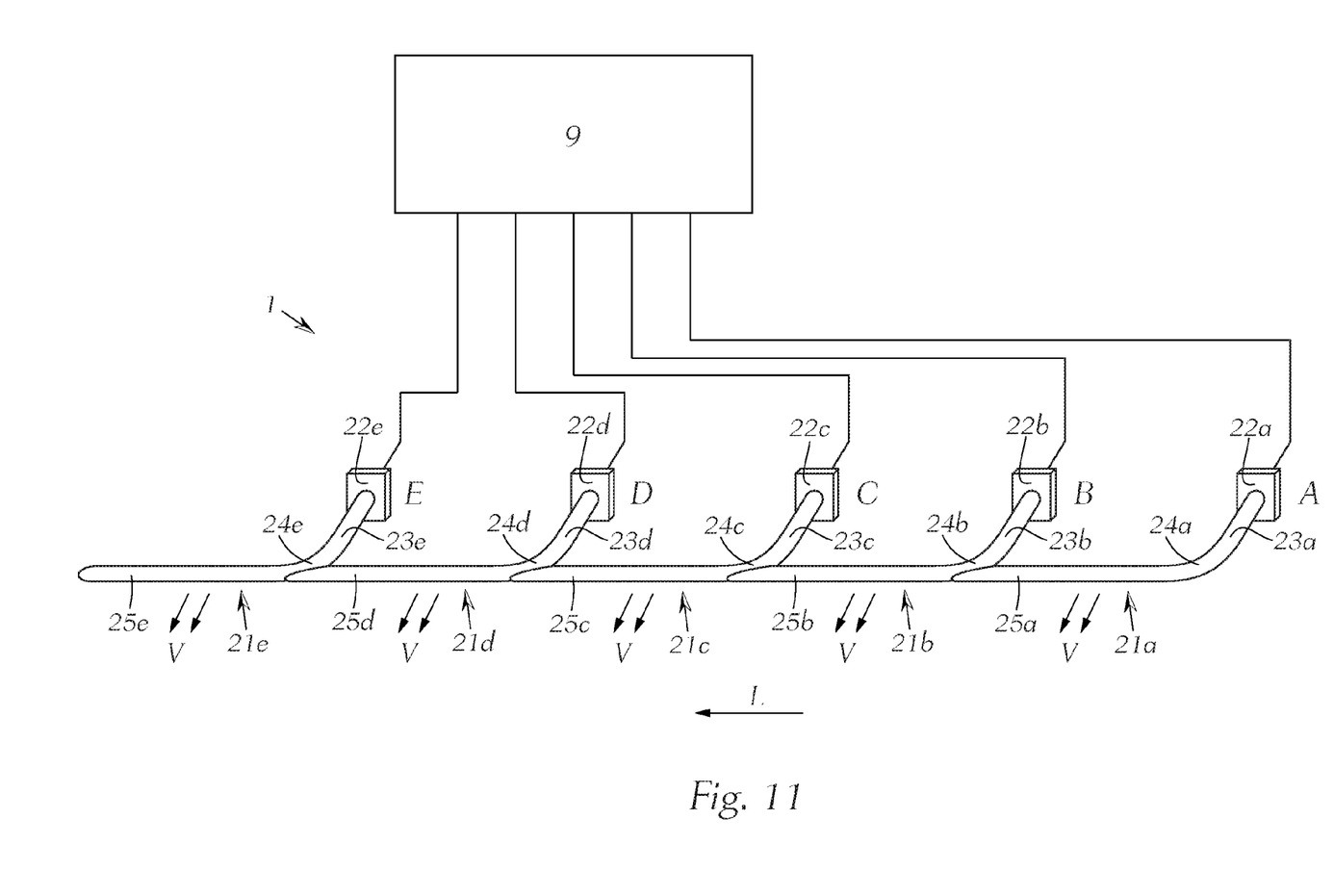
FIG. 11 shows a view of a fifth embodiment of an optical wave guide structure according to the invention.

FIG. 11 finally shows one embodiment of the invention, which likewise allows a chasing effect to be generated and the optical wave guide structure 1 of which is composed of two or more, in the example shown of five individual, optical wave guides 21a . . . 21e, which comprise one light source 22a . . . 22e at each input end, and thus five light input positions A . . . E are present.

Originating from the light source 22a . . . 22e, here essentially an identical light guide section 23a . . . 23e leads away from each optical wave guide 21a . . . 21e, and transitions via an angled region 24a . . . 24e into the actual luminous section 25a . . . 25e, which as in the previously described optical wave guides has a irregularity structure, which leads to light emission in the desired direction, indicated by the arrow V.

In the example shown, the five luminous sections 25a . . . 25e essentially connect to each other without gaps so that, seen from the front, the impression of a continuous, ribbon-shaped luminous structure is conveyed. The term "front", of course, refers only to the light emission direction and is in no way based on a vehicle or the driving direction of the same.

The actuation of the individual light sources can now be dimmed as defined by the above-described method and the variants thereof, which can be done with time lag by way of an actuating circuit 9 so as to achieve the desired chasing effect, such as in a direction of the arrow L. Having knowledge of the illustrated exemplary embodiments, a person skilled in the art will be able to implement, without difficulty, the exact actuation of the five light sources 22a . . . 22e and the activation of an actuating circuit analogous to the actuating circuit 9, wherein extensive freedom is available with regard to the shapes of the actuating ramps, the chronological progression and the desired color effects.

The invention claimed is:

1. A method for generating a chasing effect on an optical wave guide structure, the method comprising:
   providing an optical wave guide structure that comprises
      at least one optical wave guide configured to guide input light and to emit light based on irregularities embodied on the optical wave guide, and
      at least two light input positions, each of which is associated with a light source, the light source of each of the at least two light input positions collectively being the light sources; and
   changing the brightness levels of the light sources independently from each other according to predefined dimming curves as a function of time, wherein changing the brightness levels comprises:
      reducing the brightness of a first light source starting from a maximum value according to a first falling dimming ramp; and
      reducing the brightness of a second light source starting from a maximum value according to a second falling dimming ramp,
      wherein the reduction in the brightness of the second light source begins with a time delay in relation to the starting time of the reduction of the first light source.

2. The method according to claim 1, wherein the maximum value of the second light source persists until the end of the first falling dimming ramp of the first light source.

3. The method according to claim 1, wherein the light sources emit light having differing colors.

4. An optical wave guide structure comprising:
   at least one optical wave guide configured to guide input light and to emit light based on irregularities embodied in the optical wave guide;
   at least two light input position, each of which is associated with a light source; and
   an actuating circuit associated with the light sources and designed to control brightness levels of the light sources according to predefinable dimming curves as a function of time,
   wherein the actuating circuit comprises a pulse generator for generating a basic pulse having a predetermined duration,
   wherein the optical wave guide structure is configured to supply the output of the pulse generator to (i) a first pulse shaper for generating a first actuating pulse having a rising and falling dimming ramp, and (ii) a time-delay module for forming a delay in the rise and/or fall of the basic pulse,
   wherein the pulse having a delayed rising or falling edge formed in the time-delay module is supplied to at least one second pulse shaper for generating at least one second actuating pulse having an accordingly delayed rising and falling dimming ramp, and the outputs of the first and of the at least one second pulse shaper are each supplied to at least one actuating and driver stage for the light sources.

5. The optical wave guide structure according to claim 4, wherein the optical wave guide is bent.

6. The optical wave guide structure according to claim 4, wherein two optical wave guides extend in parallel and are designed as one piece.

7. The optical wave guide structure according to claim 4, which comprises two optical wave guides, which are brought together at one end and which have a light input position (A) for a first shared light source at the one end, and a second and a third light source on a second and a third light input position (B and C) at another end.

8. The optical wave guide structure according to claim 4, which comprises at least two optical wave guides and a light source associated with each optical wave guide at one end on a light input position, wherein each optical wave guide comprises a luminous section, and the luminous sections are connected to each other to form an essentially continuous luminous structure.

9. The optical wave guide structure according to claim 8, wherein light guide sections originating from the light input positions lead to the luminous sections via an angled region.

10. A method for generating a chasing effect on an optical wave guide structure, the method comprising:

providing an optical wave guide structure that comprises
- at least one optical wave guide configured to guide input light and to emit light based on irregularities embodied on the optical wave guide, and
- at least two light input positions, each of which is associated with a light source, the light source of each of the at least two light input positions collectively being the light sources; and changing the brightness levels of the light sources independently from each other according to predefined dimming curves as a function of time, wherein:
- the brightness of a first light source is increased up to a maximum value according to a first rising dimming ramp, is maintained at this value for a first fixed time duration, and is then reduced to a minimum value according to a first falling dimming ramp,
- the brightness of a second light source is increased up to a maximum value according to a second rising dimming ramp, is maintained at this value for a second fixed time duration, and is then reduced to a minimum value according to a second falling dimming ramp, and
- an activation point of the second rising dimming ramp is time-delayed by a start delay time in relation to an activation point of the first rising dimming ramp, and an activation point of the second falling dimming ramp is time-delayed by a stop delay time in relation to an activation point of the first falling dimming ramp.

11. The method according to claim 10, wherein the activation point of the second rising dimming ramp takes place during the first rising dimming ramp.

\* \* \* \* \*